Nov. 8, 1927.
R. C. ZIRINGER
1,648,528
DISPLAY RACK
Filed July 8, 1926        2 Sheets-Sheet 2
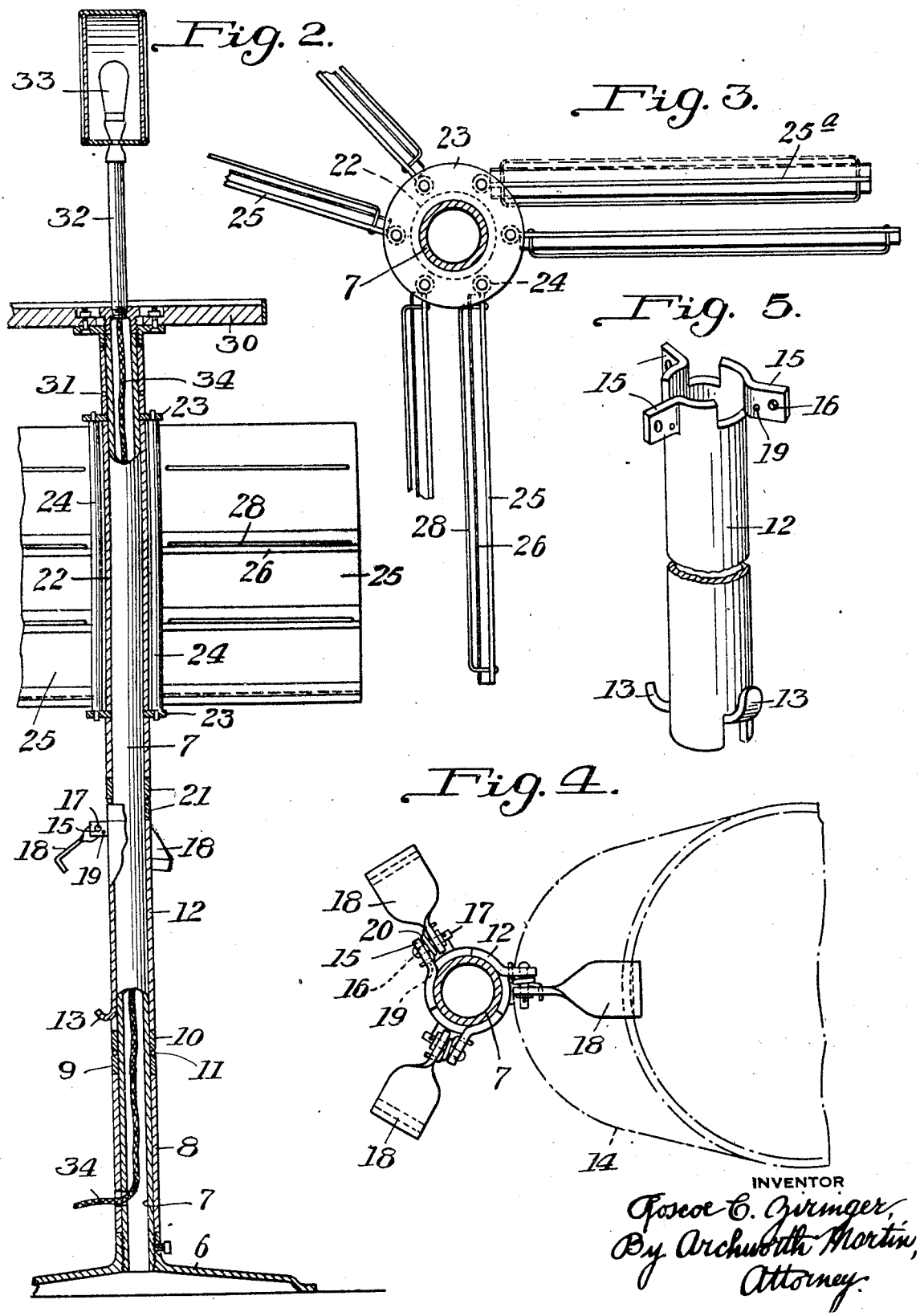

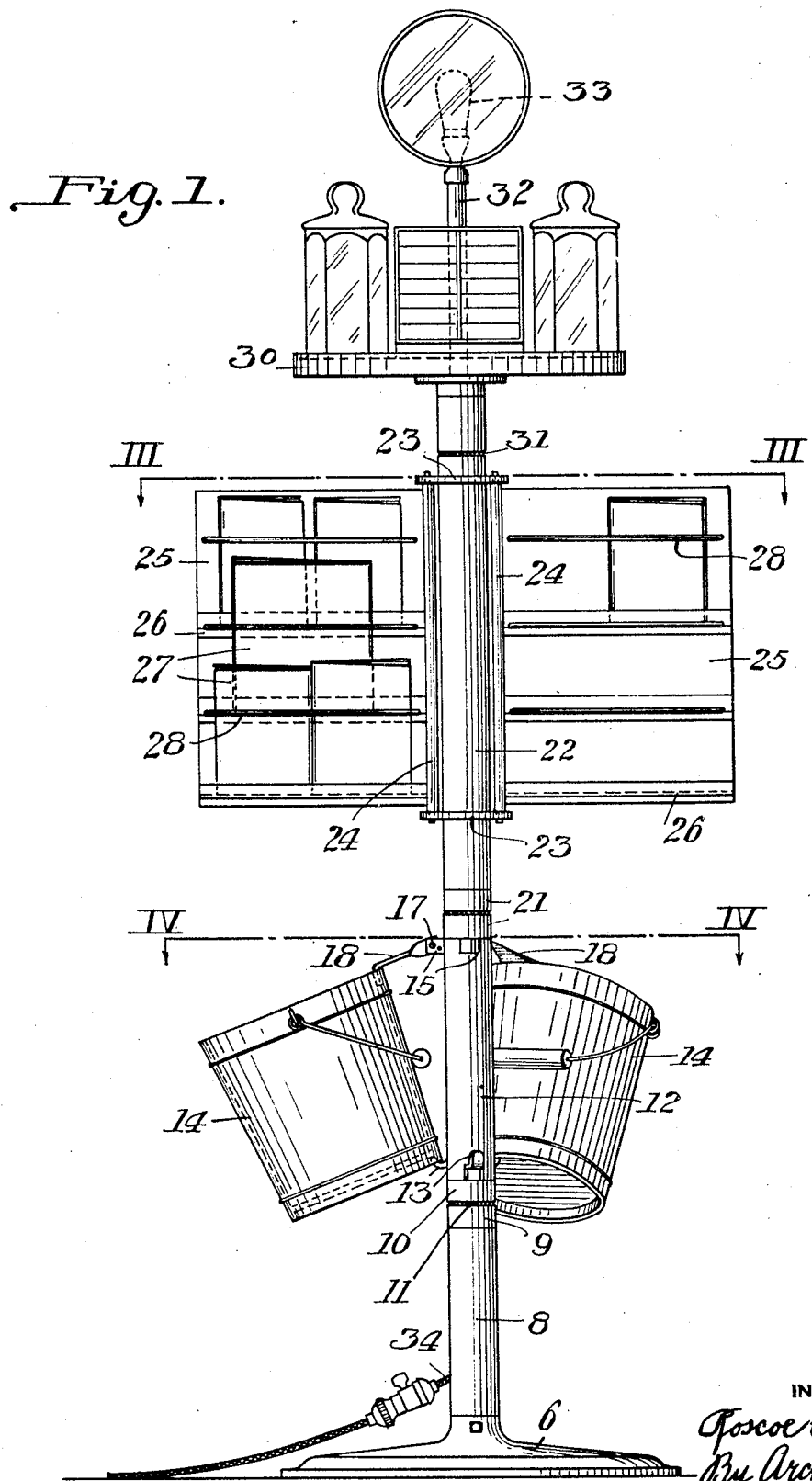

Patented Nov. 8, 1927.

1,648,528

UNITED STATES PATENT OFFICE.

ROSCOE C. ZIRINGER, OF PITTSBURGH, PENNSYLVANIA.

DISPLAY RACK.

Application filed July 8, 1926. Serial No. 121,135.

My invention relates to display cabinets, and particularly to cabinets for displaying confectionery, magazines, and the like.

One object of my invention is to provide a cabinet whereby candy pails and the like, which have a greater diameter at their open ends than at their bottoms may be compactly supported, and in such manner that they are readily accessible, notwithstanding the presence of other articles at higher points on the rack, and which may extend outwardly a greater distance than that at which the pails extend.

Another object of my invention is to provide a convenient rack for supporting magazines, etc.

Still another object of my invention is to simplify and improve generally the structure and operation of revolvable display racks.

One form which my invention may take is shown in the accompanying drawing wherein Fig. 1 is a side elevational view of apparatus embodying my invention; Fig. 2 is a vertical sectional view of the apparatus of Fig. 1, taken at right angles thereto; Fig. 3 is a view taken on the line 3—3 of Fig. 1; Fig. 4 is a view taken on the line 4—4 of Fig. 1, but with one of the pails omitted, and Fig. 5 is a perspective view, on an enlarged scale, of the pail-supporting bracket of Fig. 1.

The apparatus is shown as provided with a base member 6, with which a hollow shaft 7 has screw threaded engagement. A sleeve 8 surrounds the lower end of the shaft 7 and rests upon the base 6. Ball race members 9 and 10 of sleeve-like form are grooved at their adjacent faces to serve as race ways and retaining members for balls 11, thus forming an anti-friction bearing. A bracket 12 loosely surrounds the shaft 7 and rests upon the ball race 10. The member 12 is provided with tongues 13 that are struck from the body of the bracket and serve as hooks for engaging the flanges usually found present at the lower ends of candy buckets. Each hook serves as a vertical support for a bucket 14, as well as to hold the lower end of the bucket against outward movement. Wing portions 15 are formed upon the upper end of the bracket 12 and are provided with perforations 16 through which pins 17 (Fig. 4) extend. The pins 17 serve as pivotal supports for hooks 18 that engage the upper edges of the buckets in the manner shown in Figs. 1 and 4. The hooks 18 are of such length that the buckets are supported in an inclined position, thus rendering them more conveniently accessible and providing greater capacity circumferentially of the bracket, since the capacity of the bracket is limited only by the relatively small diameters at the lower ends of the buckets instead of by the relatively large diameters of the upper ends thereof.

Each of the wings 15 is provided with a hole 19 into which one end of a spring 20 may extend. The other end of the spring extends through a small opening in the pivoted hook 18, so that, with the spring under tension, the outer ends of the hooks will be yieldably held in their lowermost position, and thus hold the bucket in place.

An anti-friction bearing 21, which corresponds to the bearing formed by the members 9, 10 and 11, is supported upon the upper end of the sleeve 12, and in turn supports a magazine rack 22. The rack 22 has free rotative movement relative to the pail bracket 12, and is provided with a pair of annular flanges 23 that are perforated for the reception of rods 24. The lower ends of the rods 24 are shouldered so that they will not fall through the openings in the lower flange 23.

Each of the rods 24 serves as a pivotal support for a wing member 25. Each wing member 25 is provided with a series of horizontally disposed flanges 26, and the flanges may be disposed only on one side of the wing member, or on both sides thereof as in the case of the wing member 25ª of Fig. 3. The flanges serve as vertical supports for magazines 27 and such magazines are held against falling outward by means of retaining rods 28, which have their outer ends inturned and secured to the wing members 25.

A shelf 30 is disposed co-axially of the shaft 7 and rotatably supported thereon by a ball bearing 31. This shelf may be utilized to support candy jars, package goods, and the like.

A lamp bracket 32 has screw-threaded engagement with the shelf 30 or may be supported independently thereof. A lamp 33 is mounted upon the upper end of the bracket 32 and has connection with a lamp cord 34 that extends through the bracket 32 and the hollow shaft 7.

It will be understood that more than one group of pails or buckets may be supported upon the upright member, in superposed relation, and that a sufficient number of hooks may be provided to permit support of circumferentially disposed groups of buckets in compact relation, the number of buckets in each group depending upon the diameters thereof. For instance, by increasing the number of bucket supporting hooks, more than three buckets can be supported in each group if they are of sufficiently small diameter.

I claim as my invention:

A display rack, comprising an upright member, means for rotatably supporting said member, a hook protruding from the lower end of said member, and a hook protruding from the upper end of said member, the last named hook being of greater length than the first named hook, whereby said hooks may engage the upper and lower ends of an article to support the same in inclined position.

In testimony whereof I, the said ROSCOE C. ZIRINGER, have hereunto set my hand.

ROSCOE C. ZIRINGER.